(12) United States Patent
Chen

(10) Patent No.: US 9,984,436 B1
(45) Date of Patent: May 29, 2018

(54) METHOD AND SYSTEM FOR REAL-TIME EQUIRECTANGULAR PROJECTION

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 200 days.

(21) Appl. No.: 15/061,900

(22) Filed: Mar. 4, 2016

(51) Int. Cl.
*G06T 3/00* (2006.01)
*H04N 5/232* (2006.01)
*G06T 1/60* (2006.01)
*G06K 9/52* (2006.01)

(52) U.S. Cl.
CPC .............. *G06T 3/0018* (2013.01); *G06K 9/52* (2013.01); *G06T 1/60* (2013.01); *G06T 3/0093* (2013.01); *H04N 5/23238* (2013.01); *G06T 2200/28* (2013.01); *G06T 2207/20021* (2013.01)

(58) Field of Classification Search
CPC .......... H04N 5/23238; H04N 13/0029; H04N 13/0014; G06T 3/0062; G06T 3/0093; G06T 3/0018; G06T 3/0056; G03B 37/06
See application file for complete search history.

(56) References Cited

U.S. PATENT DOCUMENTS

| | | | | |
|---|---|---|---|---|
| 6,486,908 B1* | 11/2002 | Chen | ...................... | G06T 3/0018 345/441 |
| 7,058,239 B2* | 6/2006 | Singh | ...................... | G02B 13/06 348/36 |
| 7,113,650 B2* | 9/2006 | Liu | ...................... | G06K 9/00228 345/660 |
| 7,123,777 B2* | 10/2006 | Rondinelli | ............ | G06T 3/0062 359/725 |
| 7,139,440 B2* | 11/2006 | Rondinelli | ............ | G06T 3/0062 345/619 |
| 7,327,899 B2* | 2/2008 | Liu | ..................... | G06K 9/00228 345/660 |
| 7,379,623 B2* | 5/2008 | Rudolph | ............... | G06T 3/0093 345/643 |
| 7,483,590 B2* | 1/2009 | Nielsen | ................. | G06T 3/0062 345/419 |
| 8,160,394 B2* | 4/2012 | Acree | ................... | G06T 3/0018 382/293 |
| 8,265,422 B1* | 9/2012 | Jin | ........................ | H04N 5/3572 348/580 |
| 8,391,640 B1* | 3/2013 | Jin | ........................ | G06T 3/0062 382/284 |
| 8,730,323 B2* | 5/2014 | Inagaki | ................. | G06T 3/0062 348/143 |
| 8,842,190 B2* | 9/2014 | Chen | .................... | G06T 3/0062 348/222.1 |
| 9,019,341 B2* | 4/2015 | Kweon | ..................... | G06T 1/00 348/308 |

(Continued)

FOREIGN PATENT DOCUMENTS

JP 2005063141 A * 3/2005 ........... G06T 3/0062

*Primary Examiner* — John Villecco

(57) ABSTRACT

A system and machine-implemented method of real-time equirectangular projection are provided. A first macro-block in an equirectangular projection lookup table is retrieved. A second macro-block of pixels corresponding to the first macro-block determined by pixel mapping information of the first macro-block is retrieved. Destination coordinates of the pixels in the second macro-block by the pixel mapping information is determined. Pixel values of the pixels in the second macro-block to the corresponding destination coordinates are provided for output.

14 Claims, 9 Drawing Sheets

(56) References Cited

U.S. PATENT DOCUMENTS

| | | | | |
|---|---|---|---|---|
| 9,030,524 B2* | 5/2015 | Shimizu | H04N 5/23238 | 348/38 |
| 9,436,973 B2* | 9/2016 | Aoki | G06T 5/006 | |
| 9,536,287 B1* | 1/2017 | Eldar | G06T 5/002 | |
| 9,762,795 B2* | 9/2017 | Kweon | H04N 5/23238 | |
| 2002/0118890 A1* | 8/2002 | Rondinelli | G06T 3/0062 | 382/276 |
| 2003/0095131 A1* | 5/2003 | Rondinelli | G06T 3/0062 | 345/582 |
| 2003/0197780 A1* | 10/2003 | Iwaki | G06T 1/0021 | 348/36 |
| 2013/0243351 A1* | 9/2013 | Feng | G06T 3/4038 | 382/284 |
| 2014/0119653 A1* | 5/2014 | Wu | G06T 3/0018 | 382/173 |
| 2014/0152655 A1* | 6/2014 | Johnston | G06F 3/011 | 345/419 |
| 2015/0062292 A1* | 3/2015 | Kweon | H04N 5/23238 | 348/37 |
| 2015/0131924 A1* | 5/2015 | He | G06L 3/0018 | 382/284 |
| 2015/0379666 A1* | 12/2015 | Redzic | G06T 1/20 | 345/646 |
| 2016/0119551 A1* | 4/2016 | Brown | G06T 3/0062 | 345/646 |
| 2016/0260195 A1* | 9/2016 | Vegh | G06T 3/0093 | |
| 2016/0292821 A1* | 10/2016 | Cho | G06T 3/4038 | |
| 2017/0104927 A1* | 4/2017 | Mugavero | H04N 5/23238 | |
| 2017/0243384 A1* | 8/2017 | Huang | G06T 11/60 | |
| 2017/0244948 A1* | 8/2017 | Pang | H04N 13/0014 | |
| 2017/0251208 A1* | 8/2017 | Adsumilli | G06T 3/20 | |
| 2017/0270634 A1* | 9/2017 | Eggebrecht | G06T 3/0043 | |
| 2017/0287107 A1* | 10/2017 | Forutanpour | G06T 3/0062 | |
| 2017/0287200 A1* | 10/2017 | Forutanpour | G06T 15/04 | |
| 2017/0323423 A1* | 11/2017 | Lin | G06T 3/0062 | |

* cited by examiner

METHOD AND SYSTEM FOR REAL-TIME EQUIRECTANGULAR PROJECTION

BACKGROUND

The present disclosure generally relates to panoramic imaging, and more particularly to providing real-time equirectangular projection for panoramic imaging.

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Panoramic imaging systems, including 360-degree panoramic systems, may utilize equirectangular projection, which is a method to project a flat image onto a spherical surface. Equirectangular projection may involve a number of trigonometric calculations with relatively high complexities. In some aspects, equirectangular projection may be implemented in hardware, which is achieved based on a lookup table. For example, a storage unit may store the lookup table and an original image, then perform a point-by-point mapping of the pixels in the original image to a projection image by a point-by-point table lookup according to addresses in the lookup table. Implementation in hardware may reduce the utilization of bandwidth for accessing the storage units, and also require a relatively long time to complete the mapping process for a flat image. In some aspects, equirectangular projection may be implemented in computer software, for example, on a host computer. The processing speed for implementing in software may be slow. In addition, implementation in software may strongly depend on the capability of the computer, and thus not suitable for implementing in hardware.

SUMMARY

The disclosed subject matter relates to a machine-implemented method. The method comprises retrieving a first macro-block in an equirectangular projection lookup table. The method further comprises retrieving a second macro-block of pixels corresponding to the first macro-block determined by pixel mapping information of the first macro-block. The method further comprises determining destination coordinates of the pixels in the second macro-block by the pixel mapping information. In addition, the method comprises providing for output pixel values of the pixels in the second macro-block to the corresponding destination coordinates.

The disclosed subject matter also relates to a real-time equirectangular projection system. The system comprises a processing unit. The processing unit comprises a retrieving unit configured to retrieve a first macro-block in an equirectangular projection lookup table, and a second macro-block of pixels corresponding to the first macro-block determined by pixel mapping information of the first macro-block. The processing unit further comprises a mapping unit configured to map original coordinates of the pixels in the second macro-block to destination coordinates of the pixels in the second macro-block determined by the pixel mapping information. In addition, the processing unit comprises an output unit configured to output pixel values of the pixels in the second macro-block to the corresponding destination coordinates.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Provided herein are systems and methods for acquiring, creating and presenting panoramas, including still images and movies. According to one aspect of the present disclosure, a panoramic imaging system is provided. The panoramic imaging system according to the present disclosure includes at least an optical system, an image processing algorithm and a control system. Particularly, the optical system includes a set of cameras and is capable of capturing image information from a wide to ultra-wide field of view with high resolution, quality and visual reality. The image processing algorithm is capable of instantly processing image inputs by the set of cameras into continuous and seamless panoramas for real-time presentation. Finally, the control system takes commands from an end user and controls the system to perform various functions. The present system and methods integrate image acquisition, image processing, instant and real-time panoramic presentation, mobile application, wireless data communication, cloud computing, remote storage and other external services.

Figure 1:
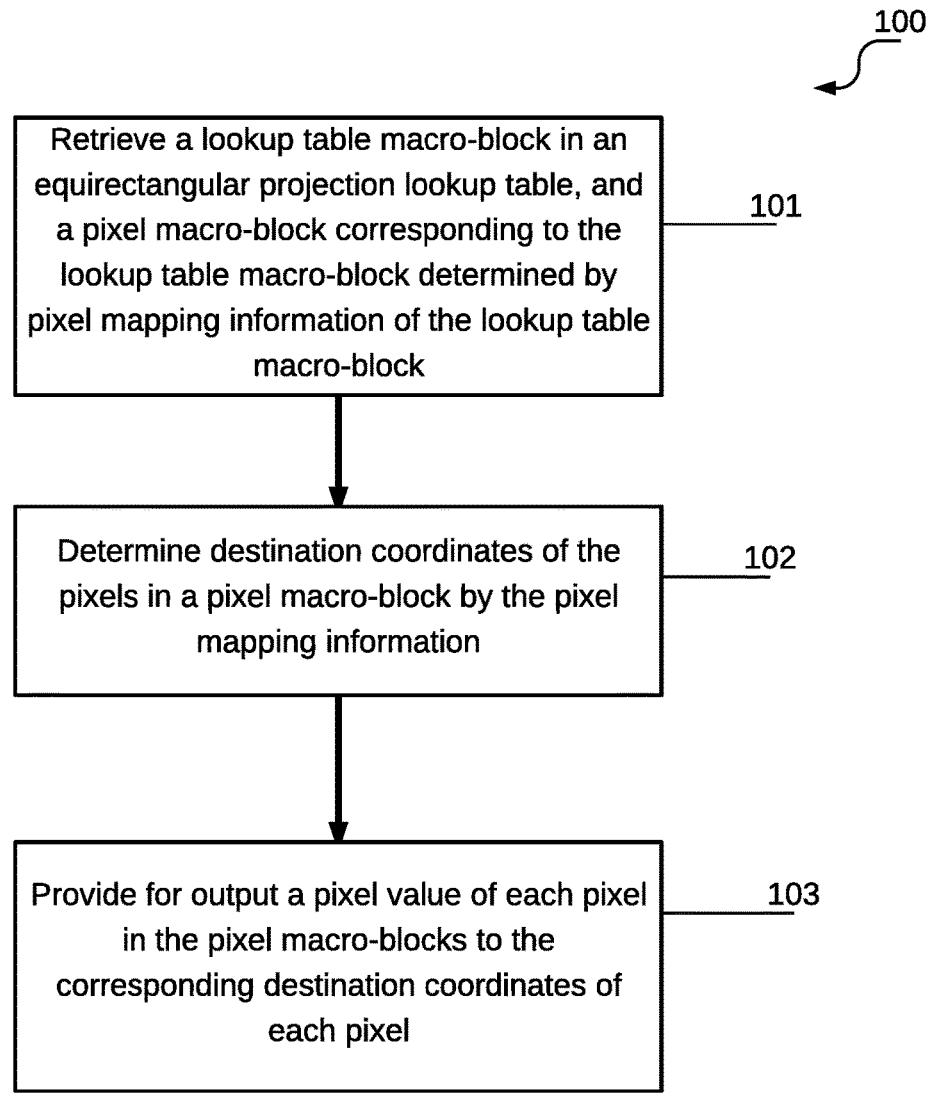
FIG. 1 illustrates a flow diagram of an example process for a real-time equirectangular projection according to one embodiment of the present disclosure.

FIG. 1 illustrates a flow diagram of an example process for a real-time equirectangular projection according to one embodiment of the present disclosure. For explanatory purposes, the example process 100 is primarily described herein with reference to an example electronic system 30 of FIG. 3; however, the example process 100 is not limited to the example electronic system 30 of FIG. 3, and the example process 100 may be performed by one or more components of the example electronic system 30 of FIG. 3. Further for explanatory purposes, the blocks of the example process 100 are described herein as occurring in serial, or linearly. However, multiple blocks of the example process 100 may occur in parallel. In addition, the blocks of the example process 100 may be performed a different order than the order shown and/or one or more of the blocks of the example process 100 may not be performed.

At step 101, a lookup table macro-block in an equirectangular projection lookup table is retrieved. A pixel macro-block corresponding to the lookup table macro-block determined by pixel mapping information of the lookup table macro-block is retrieved.

In some aspects, an equirectangular projection performs the mapping of pixels from a flat image to a panoramic image. The mapping process may locate the positions before and after the mapping by performing calculations using a trigonometric function. The calculations using a trigonometric function may include, for example, x=f*tan (x'/s); y=f*tan (y'/s)/cos (x'/s), where (x, y) is the original coordinates of a pixel, (x', y') is the destination coordinates of the pixel, s is the radius of a sphere, f is a focal length of a camera.

The process of performing calculations using a trigonometric function may be complicated and inefficient. A lookup table may be used to improve efficiency. For example, the destination coordinates of a pixel mapping from original coordinates of each pixel in a flat image may be calculated by trigonometric functions, then the destination coordinates and the original coordinates may be stored in the lookup table correspondingly. During an equirectangular projection, data in the lookup table may be searched to map the original coordinates to the destination coordinates of each pixel in a sequence.

Existing technologies may include an implementation of storing the lookup table and an original image in a storage unit, and then performing a point-by-point lookup and mapping according to the address in the lookup table. Since each time a retrieving process is performed on a single pixel, the bandwidth utilization of the storage unit may be reduced with idle bandwidth in the storage unit. In addition, mapping of a flat image may require a relatively long time, and the processing speed may depend on a computer because of the waste of bandwidth of the storage unit, thus not suitable for hardware and embedded processing.

In some aspects, pixel mapping information may be used for recording the required parameters during the process of pixel mapping and equirectangular projecting the pixel value in the flat image to the correct destination coordinates. In the existing technologies, the equirectangular projection lookup table is responsible for a unified management of all pixel mapping information, all the pixel mapping information locate in the same set. In addition, pixel mapping information of each pixel is processed sequentially during the mapping process to complete the mapping of a flat image.

In the present disclosure, the equirectangular projection lookup table may be divided into a plurality of lookup table macro-blocks. Each lookup table macro-block in the equirectangular projection lookup table may record mapping information for a plurality of pixels, similar to adding a set between the lookup table and the pixel mapping information. During a pixel mapping process, pixel macro-blocks may be retrieved from the flat image in the form of macro-blocks. Destinations locating and mapping of the pixels in the flat image may be determined by the pixel mapping information of the look up macro-blocks.

The size of a lookup table macro-block may be determined based on the capability of data processing of hardware. For example, depending on the bandwidth of the storage unit, the size of the lookup table macro-block may be set to a larger number, such as 64 by 64 pixels or 128 by 128 pixels; or set to a smaller number, e.g., 4 by 4 pixels or 8 by 8 pixels. The size of the lookup table macro-block may also be set to 16 by 16 pixels or 32 by 32 pixels in one or more implementations. Alternately or in addition, the size of the look-up macro block may be any size.

At step 102, destination coordinates of the pixels in a pixel macro-block are determined by the pixel mapping information.

The existing technologies may perform an equirectangular projection to search through the pixel mapping information in the equirectangular projection equirectangular projection lookup table, and retrieve the pixel values of the pixels the flat image to project flat image to a panoramic image to perform equirectangular projection of the pixels.

In the present disclosure, the mapping process may be determined based on different implementations of the pixel macro-blocks. In some aspects, if the flat image is stored in its entirety, dividing the flat image temporarily into a plurality of pixel macro-blocks may be needed during the retrieving processes in step 101. The plurality of pixel macro-blocks may be temporarily generated based on the original coordinates of pixels in the pixel mapping information of the lookup table macro-blocks in the equirectangular projection lookup table. Mapping from the original coordinates to destination coordinates of the pixels may be performed without additional indexing or locating steps. In some aspects, if the flat image is stored in a form of a plurality of pixel macro-blocks, mapping from the original coordinates to destination coordinates of the pixels may be performed with two or more indexing or locating steps.

At step 103, a pixel value of each pixel in the pixel macro-blocks is provided for output to the corresponding destination coordinates of each pixel.

In some aspects, a mapping process between a lookup table macro-block and a pixel macro-block, as described above, may be repeated to process a plurality of pixel macro-blocks. A panoramic image may be obtained after the completion of the mapping process for all pixels in a flat image. The mapping process may include, for example, obtaining a pixel value of the each pixel in the pixel macro-blocks and outputting the pixel value of the each pixel to the corresponding destination coordinates of each pixel. The process of outputting pixel value of the each pixel in the pixel macro-blocks to the corresponding destination coordinates of each pixel may be known and will not be further described herein. The process described in FIG. 1 may complete a process from retrieving a flat image to outputting the flat image to a panoramic image.

As described above, an equirectangular projection lookup table and a flat image may be divided into a plurality of macro-blocks. Equirectangular projection of pixel macro-blocks may be performed after retrieving the lookup table macro-blocks in a sequence. Bandwidth utilization during data reading and writing process in the storage unit may be improved. Panoramic image processing may be achieved in a high speed processor and/or one or more electronic circuitries, such as a system on chip (SOC) with a field-programmable gate array (FPGA), Accelerated Processing Unit (APU) and peripheral electronic circuitries, and independent of a computer, such as a host computer.

Figure 2A:
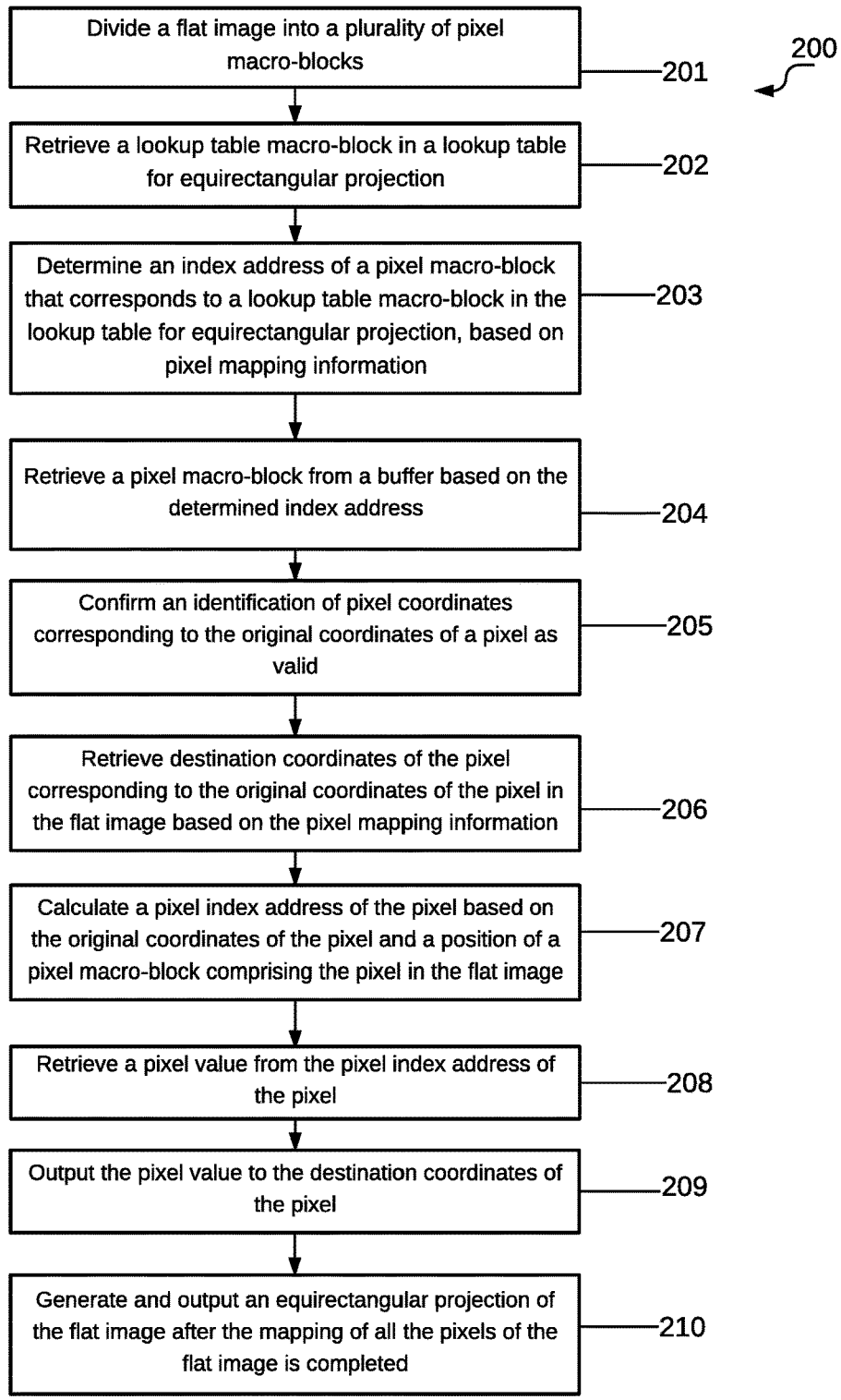
FIG. 2A illustrates a flow diagram of an example process for a real-time equirectangular projection according to another embodiment of the present disclosure.

FIG. 2A illustrates a flow diagram of an example process for a real-time equirectangular projection according to another embodiment of the present disclosure. For explanatory purposes, the example process 200 is primarily described herein with reference to an example electronic system 32 of FIG. 4; however, the example process 200 is not limited to the example electronic system 32 of FIG. 4, and the example process 200 may be performed by one or more components of the example electronic system 32 of FIG. 4. Further for explanatory purposes, the blocks of the example process 200 are described herein as occurring in serial, or linearly. However, multiple blocks of the example process 200 may occur in parallel. In addition, the blocks of the example process 200 may be performed a different order than the order shown and/or one or more of the blocks of the example process 200 may not be performed.

At step 201, a flat image is divided into a plurality of pixel macro-blocks. The plurality of pixel macro-blocks are stored in a buffer, such as a data buffer. A flat image may be acquired and generated by an image acquisition device, such as optical lens, angiography devices and other image acquisition devices. In the present disclosure, a flat image may be directed to an image collected by optical lens, including for example, a still image. In some aspects, different forms of images may include a single still image, or a dynamic video stream comprised of multi-frame continuous still images. In an acquisition and storage process for a single still image, the entire single still image may be processed. In an acquisition and storage process for a video stream, a plurality of frames, including for example, a plurality of flat images are processed sequentially. That is, whether processing of a single still image or a video stream may be considered as processing of a flat image. In some aspects, a pre-processing may be performed after the acquisition of the flat image to generate a plurality of pixel macro-blocks in the flat image, which may be needed in the subsequent processing steps.

At step 202, a lookup table macro-block in an equirectangular projection lookup table is retrieved.

The equirectangular projection lookup table may be stored in a lookup table storage unit. During the processing of a flat image processing, a lookup table retrieving controller may retrieve a lookup table macro-block in the equirectangular projection lookup table from the lookup table storage unit. In some aspects, a retrieving process may include retrieving an entire equirectangular projection lookup table from the lookup table storage unit by a hardware unit for data processing. Processing the lookup table macro-blocks in the equirectangular projection lookup table may include processing the lookup table macro-blocks in a sequence. Alternatively or in addition, each lookup table macro-block in the equirectangular projection lookup table may be retrieved in a sequence for further processing. For example, a first lookup table macro-block in the equirectangular projection lookup table may be retrieved. A mapping to a pixel macro-block may be performed based on the first lookup table macro-block. After mapping of the first lookup macro-block is completed, a second lookup table macro-block in the equirectangular projection lookup table may be retrieved for the lookup table storage unit and a mapping of the second macro-block may be performed.

At step 203, an index address of a pixel macro-block is determined based on pixel mapping information. The pixel macro-block corresponds to a lookup table macro-block in the equirectangular projection lookup table.

In the equirectangular projection lookup table, the pixel mapping information may include an identification of pixel coordinates and original coordinates of pixels. The pixel mapping information may include coordinates of a pixel macro-block that indicate the position of a pixel macro-block in the flat image, and destination coordinates of pixels for mapping from the original coordinates to achieve a correspondence between original coordinates of a pixel in the flat image and a destination coordinates for the pixel in a panoramic image. The pixel mapping information may be used when performing different operations during mapping the flat image to the panoramic image.

An index address of a pixel macro-block based on pixel mapping information may be expressed as $[(m-1)*A/a+n-1]*a*b$.

In some aspects, a resolution of a flat image may be represented as $A*B$, a listing information in the pixel mapping information in the equirectangular projection lookup table may be expressed as $1\_(x,y)\_(m,n)$, where 1 indicates that a pixel coordinate value is valid (e.g., 0 indicates the pixel coordinate value is invalid), $(x, y)$ are the original coordinates of a pixel, and $(m, n)$ indicate a position of a pixel macro-block comprising the pixel in the flat image. a is the number of pixels in a transverse direction of the pixel macro-block, b is the number of pixels in a longitudinal direction of the pixel macro-block. For example, if the size of the pixel macro-block is 16×16 pixels, then the index address of a pixel macro-block in the flat image is $[(m-1)*A/16+n-1]*256$.

At step 204, a pixel macro-block is retrieved from a buffer based on the determined index address.

The operation of retrieving a pixel macro-block may be retrieved from the buffer based on the determined index address may be known, and will not be further described herein.

At step 205, an identification of pixel coordinates corresponding to the original coordinates of a pixel is confirmed as valid.

In some aspects, there may be different imaging processes and methods to acquire a flat image and a panoramic image. During the projection of the flat image onto a panoramic image, some pixels in the flat image may not have a corresponding projection in the panoramic image, due to for example, the different imaging processes and methods to acquire a flat image and a panoramic image. In this case, the identification of the pixel that may not have a corresponding projection and may be marked as 0 by the pixel mapping information. Thus, the pixel may not be processed for projection to the panoramic image. The identification of pixel coordinates may be used as an indication as whether the pixel is involved in the mapping process. In some aspects, the identification of pixel coordinates may be marked a value of 0 as valid and a value of 1 as invalid.

At step 206, destination coordinates of the pixel corresponding to the original coordinates of the pixel in the flat image are retrieved based on the pixel mapping information.

Original coordinates of the pixel may correspond with the destination coordinates as a 1-to-1 correspondence, which may be retrieved from the pixel mapping information.

At step 207, a pixel index address of the pixel is calculated based on the original coordinates of the pixel and a position of a pixel macro-block comprising the pixel in the flat image.

The pixel index address may be expressed as a*get_mod(y,a)+x−a*(n−1).

With reference to step 203, (x, y) may be the original coordinates of a pixel; (m, n) may indicate a position of a pixel macro-block comprising the pixel in the flat image. a is the number of pixels in a transverse direction of the pixel macro-block, get_mod(y,a) is a modulus operation.

For example, a pixel index address may be expressed as 16*get_mod(y,16)+x−16*(n−1), if the size of the pixel macro-block is 16×16 pixels. get_mod(y,16) is a modulus operation. For example, when y is an integral multiple of 16, get_mod(y,16)=15; when y is not an integral multiple of 16, get_mod(y,16) is that y performs a modulus on 16 then minus 1.

At step 208, a pixel value is retrieved from the pixel index address of the pixel.

At step 209, the pixel value is outputted to the destination coordinates of the pixel. The retrieving and outputting of the pixel value may not be described further herein.

At step 210, an equirectangular projection of the flat image is generated and outputted after the mapping of all the pixels of the flat image is completed.

Figure 2B:
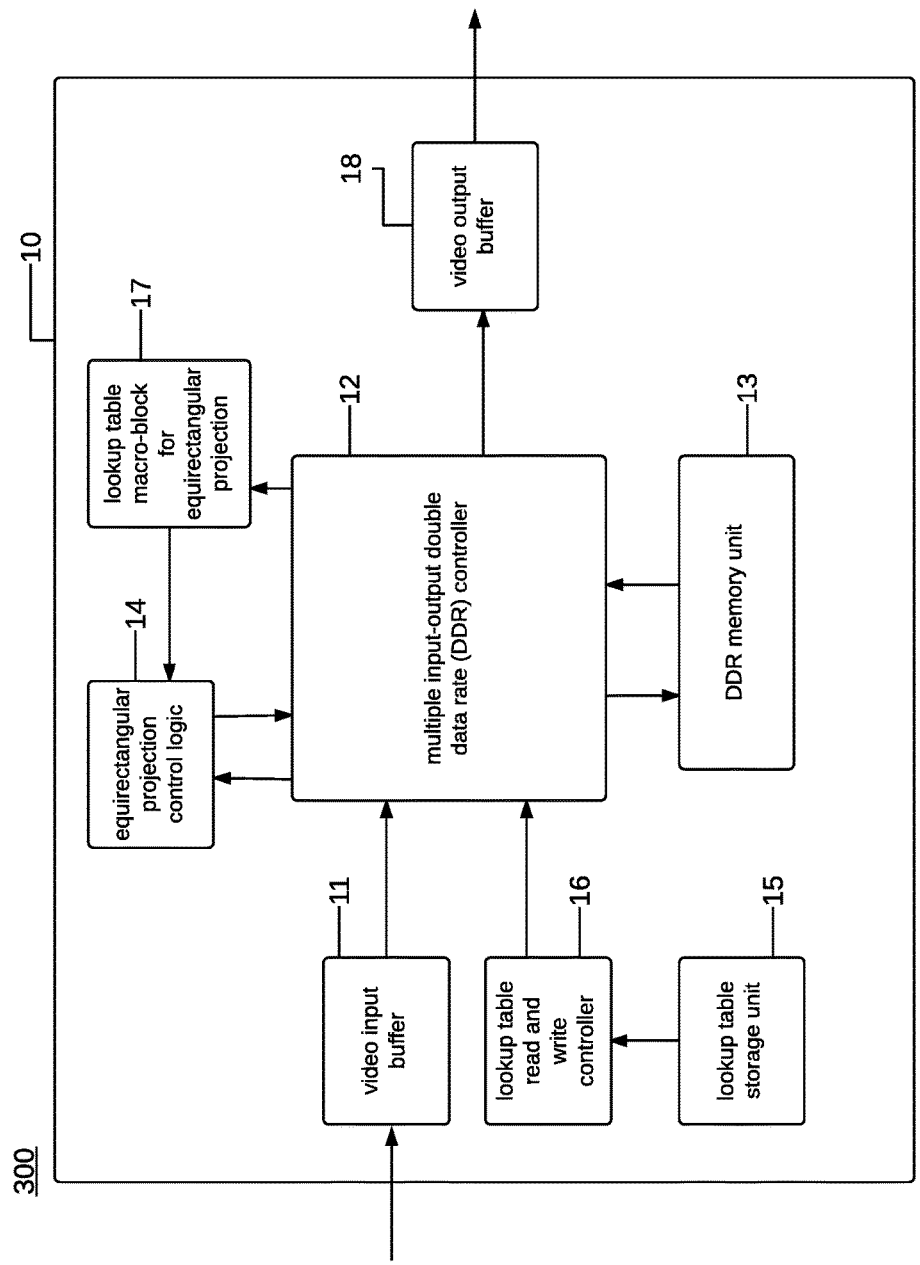
FIG. 2B an example electronic system for providing a real-time equirectangular projection of FIG. 2A according to certain aspects of the disclosure.
Figure 2C:
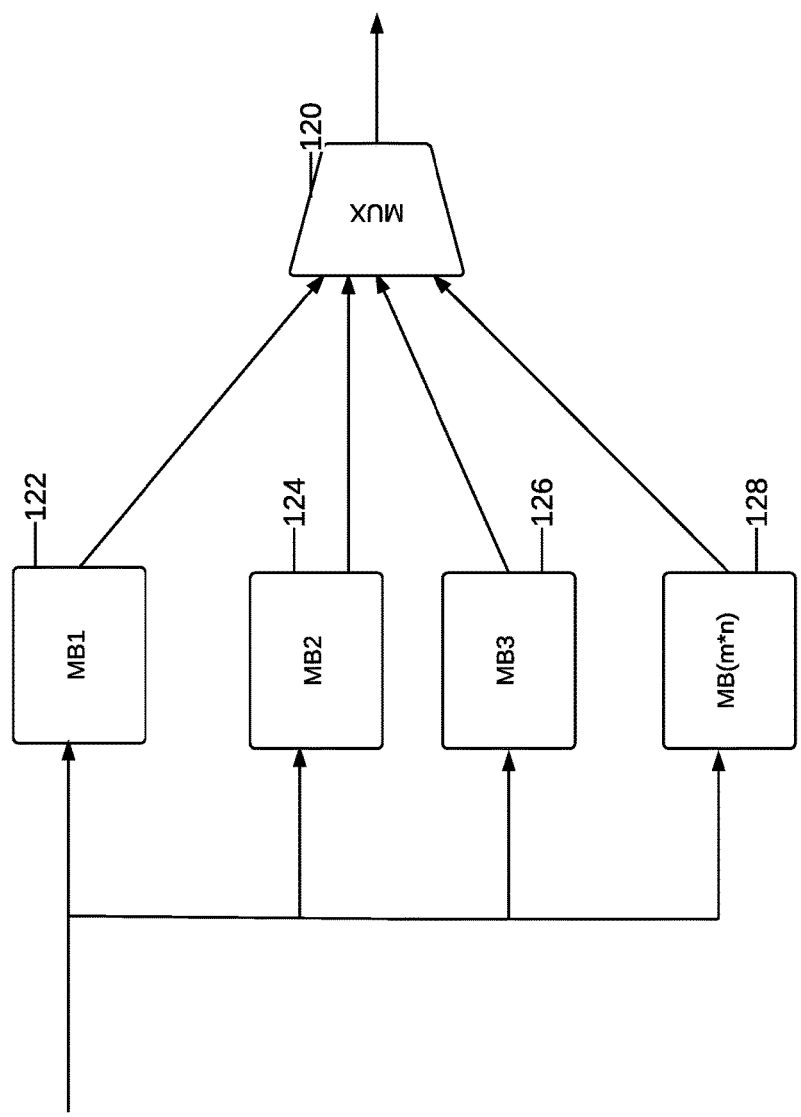
FIG. 2C is a block diagram illustrating an example electronic system for providing a real-time equirectangular projection of FIG. 2A according to certain aspects of the disclosure.
Figure 2D:
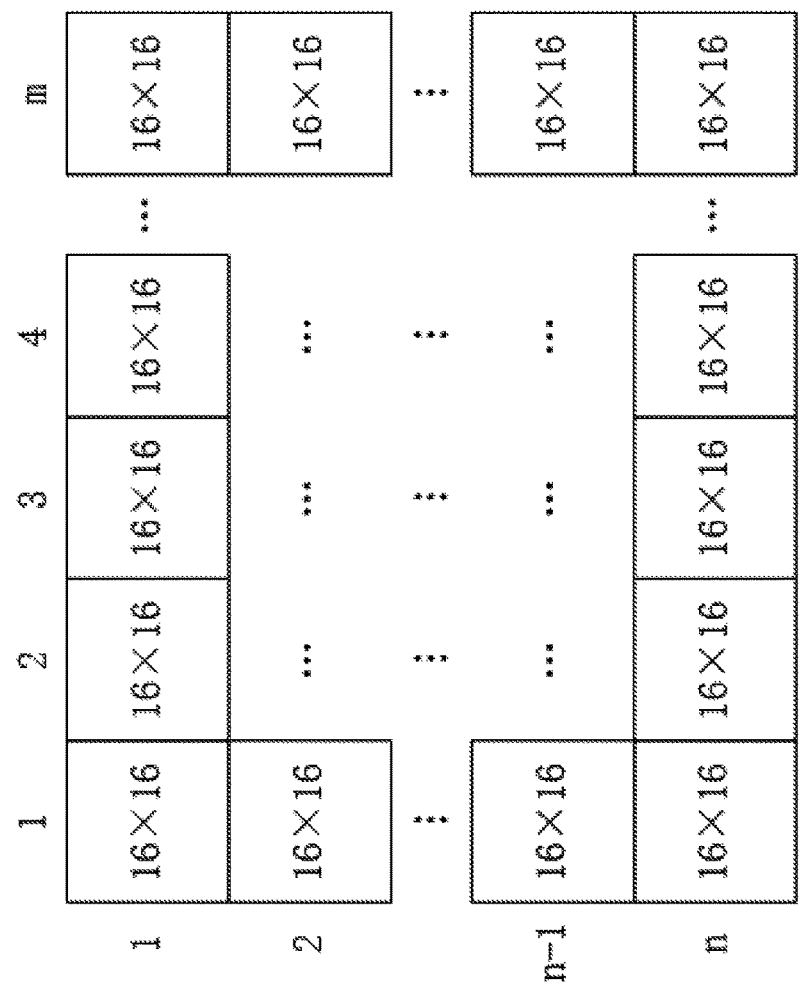
FIG. 2D is an example storage structure of a plurality of pixel macro-blocks for providing a real-time equirectangular projection of FIG. 2A according to certain aspects of the disclosure.
Figure 2E:
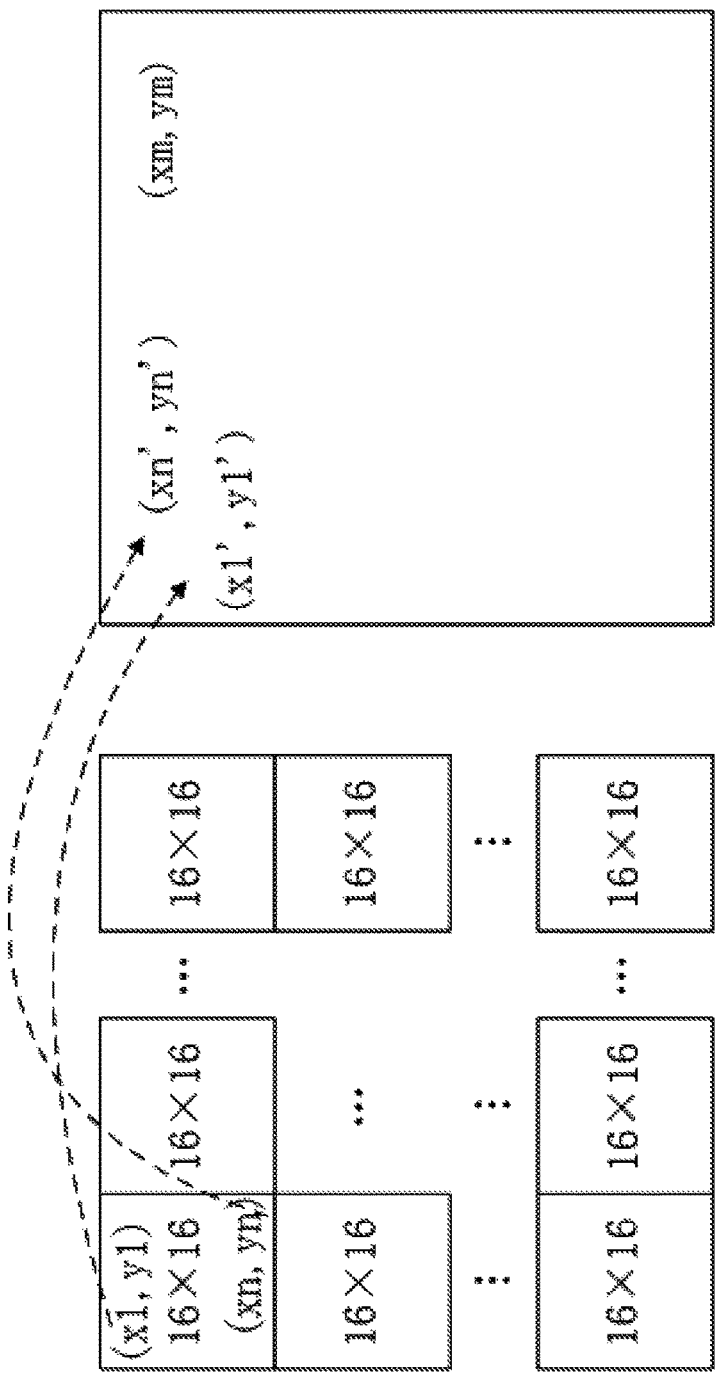
FIG. 2E is a block diagram illustrating an example mapping method for providing a real-time equirectangular projection of FIG. 2A according to certain aspects of the disclosure.

FIG. 2B is an example electronic system for providing a real-time equirectangular projection of FIG. 2A according to certain aspects of the disclosure. FIG. 2C is a block diagram illustrating an example electronic system for providing a real-time equirectangular projection of FIG. 2A according to certain aspects of the disclosure. FIG. 2D is an example storage structure of a plurality of pixel macro-blocks for providing a real-time equirectangular projection of FIG. 2A according to certain aspects of the disclosure. FIG. 2E is a block diagram illustrating an example mapping method for providing a real-time equirectangular projection of FIG. 2A according to certain aspects of the disclosure.

In some aspects, the example processes for a real-time equirectangular projection with reference to FIGS. 2A-2E may be implemented on one or more electronic circuitries, such as a system on chip (SOC) with a field-programmable gate array (FPGA). FPGA may include a hardware (e.g., ASIC) module that integrates different functions, including for example, functions associated with Random-Access Memory (RAM) and clock management. A hardware implementation scheme may be selected depending on the applications of the present disclosure. As shown in FIG. 2B, FPGA 10 comprises video input buffer 11, multiple input-output double data rate (DDR) controller 12, DDR memory unit 13, equirectangular projection control logic 14, lookup table storage unit 15, lookup table read and write controller 16, lookup table macro-block for equirectangular projection 17 and video output buffer 18. The blocks 11-17 in FPGA 10 as described above may perform the example processes for a real-time equirectangular projection with reference to FIG. 2A.

Before processing a flat image, an equirectangular projection lookup table may be saved to lookup table storage unit 15. Video input buffer 11 may receive image data of the flat image collected by one or more digital cameras and output to multiple input-output DDR controller 12. Multiple input-output DDR controller 12 may write the image data to DDR memory unit 13, according to one or more operations as shown in FIG. 2C. As shown in FIG. 2C, multiplexer (MUX) 120 may divide a flat image into a plurality of pixel macro-blocks, such as including macro-block 122 (MB1), macro-block 124 (MB2), macro-block 126 (MB3), and macro-block 128 (MB (m*n)), where (m, n) may indicate a position of a pixel macro-block comprising the pixel in the flat image. MUX 120 may output a pixel macro-block from the plurality of pixel macro-blocks to multiple input-output DDR controller 12. Each pixel macro-block may be outputted from multiple input-output DDR controller 12 to DDR memory unit 13. Operations as shown in FIG. 2C may be implemented in video input buffer 11. In some aspects, the operations as shown in FIG. 2C may be operated on a pixel macro-block with a size of 16×16 pixels. FIG. 2D shows an example storage structure of a plurality of pixel macro-blocks with the size of 16×16 pixels for each of the plurality of pixel macro-blocks. The example storage structure of the plurality of pixel macro-blocks may be obtained after performing the operations as shown in FIG. 2C.

During the mapping process of a pixel in the flat image, lookup table read and write controller 16 may read an equirectangular projection lookup table from lookup table storage unit 15 and output the look up table to multiple input-output DDR controller 12. Multiple input-output DDR controller 12 may write the lookup table of equirectangular projection to DDR storage unit 13. In the present embodiment, the entire mapping process may be completed under the control of equirectangular projection control logic 14. In some aspects, equirectangular projection control logic 14 may control Multiple input-output DDR controller 12 to read a lookup table macro-block with a size of 16×16 pixels from DDR storage unit 13 and store the lookup table macro-block in lookup table macro-block for equirectangular projection 17 in a cache to perform a mapping between the a lookup macro-block and a pixel macro-block, as described above with reference to FIG. 2A.

FIG. 2E illustrates an example mapping method for providing a real-time equirectangular projection of FIG. 2A according to certain aspects of the disclosure. As shown in FIG. 2E, the pixel value of a pixel with an identification in a flat image may be mapped to a position in a panoramic image. For example, the pixel value of a pixel with the original coordinates of (x1, y1) may be mapped to destination coordinates of (x1', y1'), and the pixel value of a pixel with the original coordinates of (xn, yn) may be mapped to destination coordinates of (xn', yn'). In some aspects, if the original coordinates of a pixel corresponding to destination coordinates (e.g., (xm, ym)) in the panoramic image do not exist, then the pixel value of the pixel may be set as a pixel value of a black pixel. Alternatively or in addition, the pixel value of the pixel may be set as an average value of the pixel values of pixels that surround the pixel, to allow a smooth image transition in the panoramic image. It should be noted that the mapping process in FIG. 2E may only illustrate a change of position for pixel values before and after mapping, and may not illustrate actual mapping results.

In some aspects, the example processes for a real-time equirectangular projection with reference to FIGS. 2A-2E may be implemented in a Graphics Processing Unit (GPU), a Digital Signal Processor (DSP), or other high speed processors, and integrated circuits such as an ASIC.

As described above, an equirectangular projection lookup table and a flat image may be divided into a plurality of macro-blocks. Equirectangular projection of pixel macro-blocks may be performed after retrieving the lookup table macro-blocks in a sequence. Bandwidth utilization during data reading and writing process in the storage unit may be improved. Panoramic image processing may be achieved in a high speed processor and/or an integrated circuit including an integrated circuit developed for a particular use (ASIC) and independent of a computer, such as a host computer. The detailed design of a mapping process of pixel values may allow a more accurately generated panoramic image.

Figure 3:
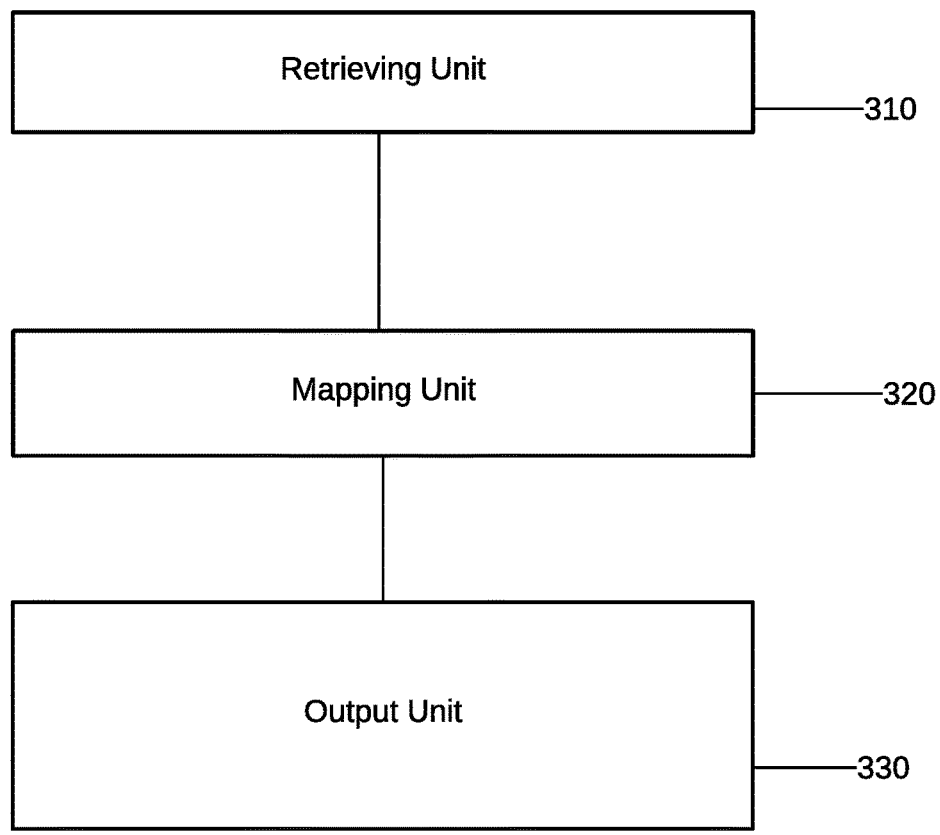
FIG. 3 is a block diagram illustrating an example electronic system for providing a real-time equirectangular projection of FIG. 1 according to certain aspects of the disclosure.

FIG. 3 is a block diagram illustrating an example electronic system for providing a real-time equirectangular projection of FIG. 1 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

The example electronic system of FIG. 3 includes retrieving unit 310, mapping unit 320, and output unit 330. Retrieving unit 310 may retrieve a lookup table macro-block in the equirectangular projection lookup table. In some aspects, retrieving unit 310 may retrieve a pixel macro-block corresponding to the lookup table macro-block determined based on pixel mapping information in the lookup table macro-block. Mapping unit 320 may determine destination coordinates of a pixel in the pixel macro-block determined based on pixel mapping information. Output unit 330 may output the pixel value of the pixel in the pixel macro-block to the destination coordinates.

In some aspects, the example electronic system of FIG. 3 may effectively improves bandwidth utilization of data reading and writing process in a storage unit, thus making the panoramic image processing to be achieved in high speed processor or ASIC and independent of host computer.

Figure 4:
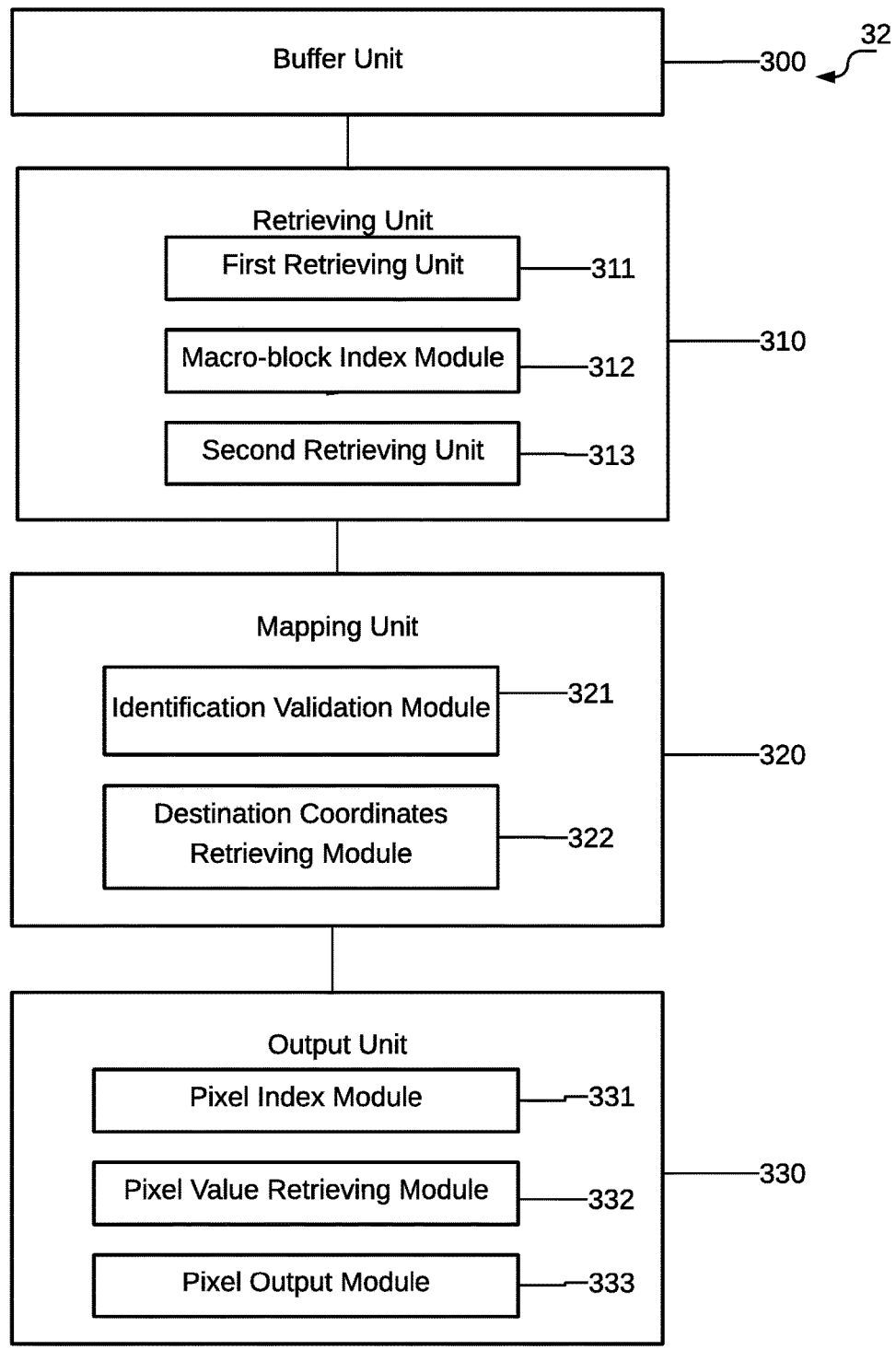
FIG. 4 is a block diagram illustrating an example electronic system for providing a real-time equirectangular projection of FIG. 2A according to certain aspects of the disclosure.

FIG. 4 is a block diagram illustrating an example electronic system for providing a real-time equirectangular projection of FIG. 2A according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

The example electronic system of FIG. 4 includes buffer unit 300, retrieving unit 310, mapping unit 320, and output unit 330. Retrieving unit 310 includes first retrieving module 311, macro-block index module 312, and a second retrieving module 313. Mapping unit 320 includes identification validation module 321 and destination coordinates retrieving module 322. Output unit 330 includes pixel index module 331, pixel value retrieving module 332 and pixel output module 333.

Retrieving unit 310 may retrieve a lookup table macro-block in an equirectangular projection lookup table. In some aspects, retrieving unit 310 may retrieve a pixel macro-block corresponding to the lookup table macro-block determined based on pixel mapping information in the lookup table macro-block. First retrieving module 311 may retrieve a lookup table macro-block in an equirectangular projection lookup table. Macro-block index module 312 may confirm a macro-block index address of a pixel macro-block corresponding to the lookup table macro-block determined by pixel mapping information of the lookup table macro-block. Second retrieving module 313 may retrieve a pixel macro-block from a buffer based on the macro-block index address.

In the equirectangular projection lookup table, the pixel mapping information may include an identification of pixel coordinates, original coordinates of pixels, and destination coordinates of pixels for mapping from the original coordinates to achieve a correspondence between original coordinates of a pixel in a flat image and a destination coordinates for the pixel in a panoramic image.

Identification validation module 321 may validate an identification of pixel coordinates corresponding to original coordinates of a pixel as valid. Destination coordinates retrieving module 322 may retrieve destination coordinates of a pixel corresponding to the original coordinates of the pixel based on pixel mapping information. Mapping unit 320 may determine destination coordinates of a pixel in the pixel macro-block determined based on pixel mapping information.

Output unit 330 may output the pixel value of the pixel in the pixel macro-block to the destination coordinates. Pixel index module 331 may calculate a pixel index address of a pixel based on the original coordinates of the pixel and coordinates of a pixel macro-block. Pixel value retrieving module 332 may retrieve a pixel value from the pixel index address. Pixel output module 333 may output the pixel value of the pixel to destination coordinates of the pixel.

An index address of a pixel macro-block based on pixel mapping information may be expressed as $[(M-1)*A/a+n-1]*a*b$.

The pixel index address may be expressed as $a*get\_mod(y,a)+x-a*(n-1)$. $(x, y)$ may be the original coordinates of a pixel; $(m, n)$ may indicate a position of a pixel macro-block comprising the pixel in the flat image. a is a number of pixels in a transverse direction of the pixel macro-block, $get\_mod(y,a)$ is a modulus operation.

Figure 5:
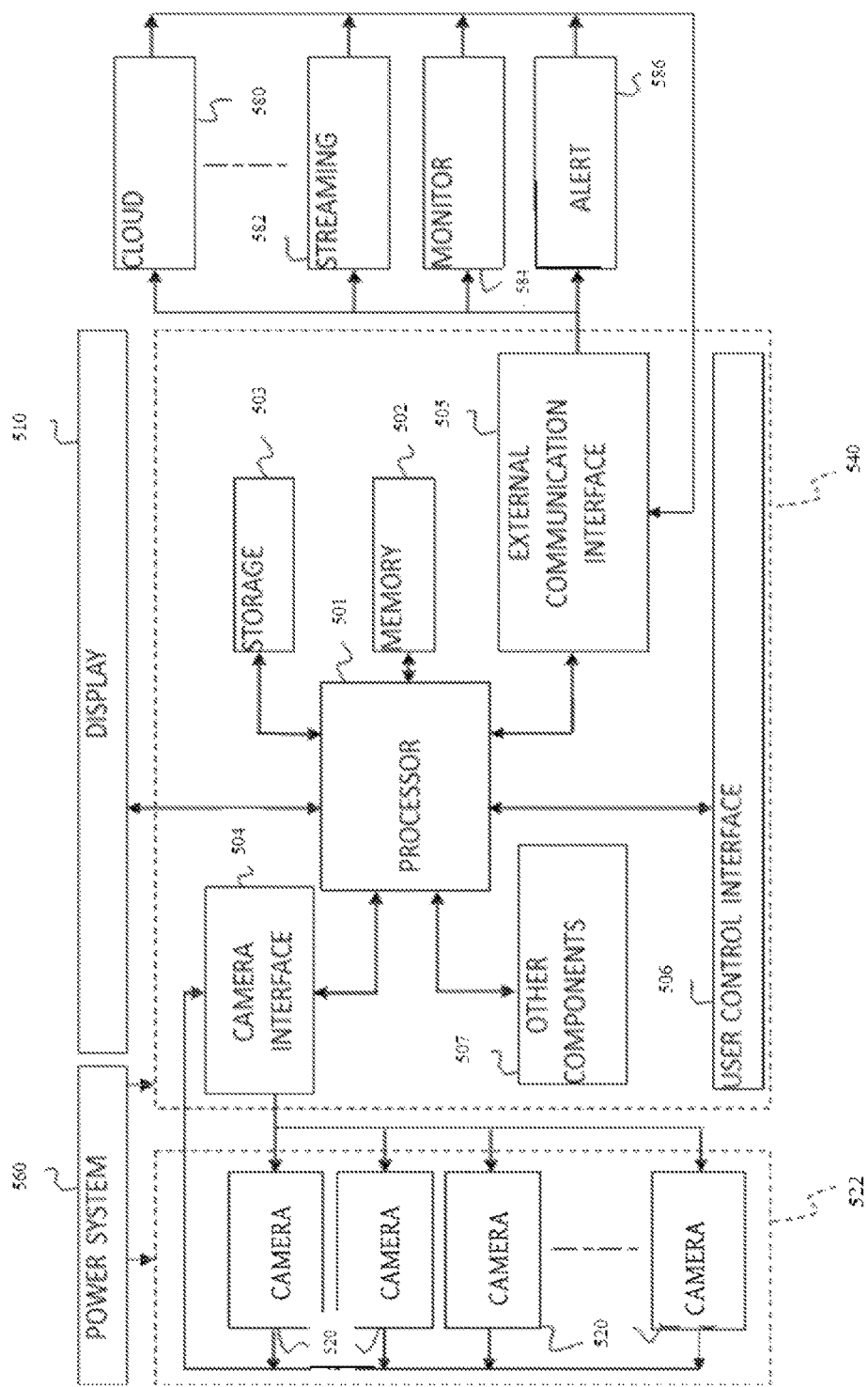
FIG. 5 conceptually illustrates an example electronic system with which some implementations of the subject technology can be implemented.

FIG. 5 conceptually illustrates an example electronic system 500 with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

The example electronic system may include an example panoramic imaging system. According to the present disclosure, the example panoramic imaging system includes a control system that controls the functions of the optical system 522 and at least an image processing algorithm. Particularly, the control system 540 includes at least a processor 501, a memory 502, a storage device 503, a camera interface 504, an external communication interface 505, and a user control interface 506. The control system 540 can be a general-purpose computer system such as a Personal Computer (PC), or preferably a custom-designed computing system. Particularly in some embodiments, the control system 540 is a system on chip (SOC); that is, an integrated circuit (IC) integrates all components and functions of the control system 540 into a single chip, which makes the present panoramic imaging system portable and electronically durable as a mobile device. In some embodiments, the control system 540 may be located internally within a same housing where the optical system 522 is located. Alternatively, in other embodiments, the control system 540 is separated from the optical system 522 to allow end users' selection of different models of an optical system 522 to be used with the control system 540.

The storage device 503 is preloaded with at least the image processing algorithm of the present disclosure. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 501 carries out instructions of the various algorithms. Thus, the various software programs, stored on the storage device 503 and executed in the memory 502 by the processor 501, direct the control system 540 to act in concert with the optical system 522 to perform various functions, which include but are not limited to receiving commands from an end user or an external device or service 501, defining the precise geometry of the cameras 520, commanding the cameras 520 to capture raw image data, tagging and storing raw data in a local storage device 503 and/or commuting raw data to an external device or service 501, processing raw data to create panoramic images or videos according to commands received, presenting generated panoramas on a local display 510 and/or communicating generated panoramas to be stored or presented on an external device or service 580, 582, 584 and 586.

The processor 501 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 540 may employ a multi-core processor that has two or more CPUs or array processors that have multiple processors operating in parallel. In some embodiments, the processor 501 is an application specific integrated circuit (ASIC) that is designed for a particular use rather than for general purpose use. Particularly, in some embodiments, the processor 501 is a digital signal processor (DSP) designed for digital signal processing. More particularly, in some embodiments, the processor 501 is an on-chip image processor, specialized for image processing in a portable camera system. In some embodiments, the control system 540 includes a graphic processing unit (GPU), which has a massively parallel architecture consisting of thousands of smaller, more efficient cores designed for handling multiple tasks simultaneously. Particularly, in some embodiments, the control system 540 may implement GPU-accelerated computing, which offloads compute-intensive portions of an algorithm to the GPU while keeping the remainder of the algorithm to run on the CPU.

The memory 502 and the storage 503 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 540 is a single chip system, the memory 502 and storage 503 blocks are also integrated on-chip with the processor 501 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for providing real-time equirectangular projection for panoramic imaging. From these various memory units, the processor 501 retrieves instructions to execute and data to process in order to execute the processes of some implementations.

The camera interface 504 of the present disclosure can be any form of command and data interface usable with a camera 520, such as a digital camera. Exemplary embodiments include USB, FireWire and any other interface for command and data transfer that may be commercially available. Additionally, it is preferred, although not required, that the optical system 522 be equipped with a single digital control line that would allow a single digital signal to command all the cameras 520 simultaneously to capture an image of a scene.

The external communication interface 505 of the present disclosure can be any data communication interface, and may employ a wired, fiber-optic, wireless, or another method for connection with an external device or service 580, 582, 584 and 586. Ethernet, wireless-Ethernet, Bluetooth, USB, FireWire, USART, SPI are exemplary industry standards. In some embodiments, where the control system 540 is a single chip system, the external communication interface 505 is integrated on-chip with the processor 501 as well as other peripherals and interfaces.

The user control interface 506 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

The control system 540 of the present disclosure may further include other components that facilitate its function. For example, the control system 540 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. The control system 540 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. The control system 540 may optionally be equipped with a light sensor for environmental light conditions, so that the control system 540 can automatically adjust hardware and/or software parameters of the system.

In some embodiments, the present panoramic imaging system is further equipped with an internal power system 560 such as a battery or solar panel that supplies the electrical power. In other embodiments, the panoramic imaging system is supported by an external power source. In some embodiments, the panoramic imaging system is further equipped with a display 510, such that panoramic photos may be presented to a user instantly after image capture, and panoramic videos may be displayed to a user in real time as the scenes are being filmed.

In some embodiments, the present panoramic imaging system may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 580, online video streaming 582 and file sharing 582, remote surveillance 584, and alert 586 for home and public security.

The exemplary embodiments set forth above are provided to give those of ordinary skill in the art a complete disclosure and description of how to make and use the embodiments of the devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the disclosure are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) is hereby incorporated herein by reference.

It is to be understood that the disclosures are not limited to particular compositions or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A machine-implemented method for real-time equirectangular projection, comprising:
retrieving a macro-block in an equirectangular projection lookup table;
retrieving a block of pixels corresponding to the macro-block determined by pixel mapping information of the macro-block;
determining destination coordinates of the pixels in the block by the pixel mapping information; and
providing for output pixel values of the pixels in the block to the corresponding destination coordinates.

2. The machine-implemented method of claim 1, further comprising:
dividing a frame of a flat image into a plurality of the blocks of pixels prior to the retrieving the block of pixels; and
storing the plurality of the blocks of pixels in a storage unit.

3. The machine-implemented method of claim 2, further comprising:
retrieving a plurality of the macro-blocks in the equirectangular projection lookup table;
determining an index address of the block of pixels; and
retrieving the block of pixels from the storage unit.

4. The machine-implemented method of claim 3, wherein the pixel mapping information comprises:
an identification of coordinates of the pixels in the block;
original coordinates of the pixels in the block;
coordinates of the block in the frame of the flat image; and
destination coordinates of the pixels in the block.

5. The machine-implemented method of claim 4, further comprising:
confirming whether the identification of coordinates of the pixels in the block is valid;
retrieving the destination coordinates corresponding to the original coordinates determined by the pixel mapping information.

6. The machine-implemented method of claim 5, wherein the providing for output pixel values of the pixels comprises:
calculating a pixel index address for each of the pixels in the block based on the original coordinates of the pixels in the block and coordinates of the block;
retrieving a pixel value from the pixel index address; and
providing for output the pixel value to the destination coordinates.

7. The machine-implemented method of claim 5, wherein the determining the index address of the block of pixels is determined as $[(m-1)*A/a+n-1]*a*b$, and wherein the calculating a pixel index address is determined as $a*get\_mod(y,a)+x-a*(n-1)$, and wherein m is a x-coordinate of the block in the frame of the flat image, A is a number of pixels in a transverse direction of the frame of the flat image, a is a number of pixels in a transverse direction of the block, n is a y-coordinate of the block in the frame of the flat image, b is a number of pixels in a longitudinal direction of the frame of the flat image, (x,y) is an original coordinate of a pixel in the block, $get\_mod(y,a)$ is a modulus operation.

8. A real-time equirectangular projection system comprising:

at least one processor that is configured to:
  retrieve a macro-block in an equirectangular projection lookup table, and a block of pixels corresponding to the macro-block determined by pixel mapping information of the macro-block;
  map original coordinates of the pixels in the block to destination coordinates of the pixels in the block determined by the pixel mapping information; and
  output pixel values of the pixels in the block to the corresponding destination coordinates.

9. The real-time equirectangular projection system of claim 8, further comprising:
  a storage unit configured to divide a frame of a flat image into a plurality of the blocks of pixels and store the plurality of the blocks of pixels in a storage unit.

10. The real-time equirectangular projection system of claim 9, wherein the at least one processor is further configured to:
  confirm a block index address of the block of pixels corresponding to the macro-block determined by pixel mapping information of the macro-block; and
  retrieve the block of pixels from the storage unit based on the block index address.

11. The real-time equirectangular projection system of claim 10, wherein the pixel mapping information comprises:
  an identification of coordinates of the pixels in the block;
  original coordinates of the pixels in the block;
  coordinates of the block in the frame of the flat image; and
  destination coordinates of the pixels in the block.

12. The real-time equirectangular projection system of claim 11, wherein the at least one processor is further configured to:
  confirm the identification of coordinates of the pixels in the block is valid;
  retrieve the destination coordinates of the pixels in the block corresponding to the original coordinates of the pixels in the block determined by the pixel mapping information of the macro-block.

13. The real-time equirectangular projection system of claim 11, wherein the at least one processor is further configured to:
  calculate a pixel index address corresponding to a pixel in the block based on the original coordinate of the pixel and the coordinates of the block;
  retrieve a pixel value from the pixel index address; and
  output the pixel value to the destination coordinates of the pixel.

14. The real-time equirectangular projection system of claim 13, wherein the determining the index address of the block of pixels is determined as $[(m-1)*A/a+n-1]*a*b$, and wherein the calculating a pixel index address is determined as $a*get\_mod(y,a)+x-a*(n-1)$, and wherein m is a x-coordinate of the block in the frame of the flat image, A is a number of pixels in a transverse direction of the frame of the flat image, a is a number of pixels in a transverse direction of the block, n is a y-coordinate of the block in the frame of the flat image, b is a number of pixels in a longitudinal direction of the frame of the flat image, (x,y) is an original coordinate of a pixel in the block, get_mod(y,a) is a modulus operation.

* * * * *